United States Patent [19]

Snowball et al.

[11] Patent Number: 4,771,680
[45] Date of Patent: Sep. 20, 1988

[54] TEA BREWING APPARATUS

[75] Inventors: Malcolm R. Snowball, St. Leonards-on-Sea; Cecil Hayes, Hastings, both of Great Britain

[73] Assignee: W. M. Still & Sons Limited, East Sussex, Great Britain

[21] Appl. No.: 81,188

[22] Filed: Aug. 4, 1987

Related U.S. Application Data

[63] Continuation-in-part of Ser. No. 859,315, Aug. 11, 1986, abandoned.

[51] Int. Cl.$^4$ ............................................. A47J 31/46
[52] U.S. Cl. ........................................ 99/295; 99/306
[58] Field of Search ............... 99/295, 306, 299, 279, 99/292, 300, 301, 313, 316, 317, 323; 426/433; 210/416.1, 485, 481

[56] References Cited

U.S. PATENT DOCUMENTS

| | | | |
|---|---|---|---|
| 2,263,610 | 11/1941 | Cain | 99/306 |
| 3,356,010 | 12/1967 | Eisendrath | 99/299 |
| 4,343,232 | 8/1982 | Corbier | 99/299 |
| 4,506,597 | 3/1985 | Karns | 99/295 |
| 4,642,190 | 2/1987 | Zimmerman | 210/481 |

Primary Examiner—Robert W. Jenkins
Attorney, Agent, or Firm—Wood,Dalton,Phillips,Mason & Rowe

[57] ABSTRACT

Tea making apparatus of the type comprising of the means for supplying heated water over a basket for holding a bed of tea leaves. In accordance with the invention a syphon tube is provided to delay the passage of hot water through the tea leaf bed until the hot water reaches a pre-determined level so that the hot water is in contact with the tea leaves for a period in excess of one minute before discharge. The inlet arm of the syphon tube has a roughened inner surface to maintain droplets of brewed tea therein, following discharge of the brew from the tea leaf bed, the droplets serving to aid the start of a secondary syphon on accumulation of brewed tea above the level of the syphon inlet. Thus after the initial brew, water remains in contact with the tea leaf bed for only a short time so that the leaves do not become oversoaked.

12 Claims, 4 Drawing Sheets

TEA BREWING APPARATUS

This application comprises a continuation-in-part of application Ser. No. 859,315, filed Aug. 11, 1986, now abandoned.

Hitherto it has not been possible to produce high quality tea beverage in apparatus similar to a coffee brewer, in which hot water is poured over a bed of tea leaves, primarily we believe because either the hot water does not remain in contact with the tea leaves for a sufficient time or the tea is allowed to brew for too long so that it acquires a 'stewed' taste.

The general object of the invention is, therefore, to enable tea making apparatus to be produced or a coffee brewer adapted so as to be able to make reasonable quality tea beverage.

Tea making apparatus in accordance with this invention comprises means for supplying heated water over a basket for holding a bed of tea leaves, wherein a syphon tube is provided to delay the passage of hot water through the tea leaf bed until the hot water reaches a pre-determined level and wherein the inlet arm of the syphon tube has a roughened inner surface to maintain droplets of brewed tea therein, following droplets serving to aid the start of a secondary syphon on accumulation of brewed tea above the level of the syphon inlet.

The brewing time is long enough to give a good extraction of tea flavour from the leaves into the hot water without the tea becoming 'stewed' and it thus provides tea of highly acceptable quality.

Preferably, the brew time is at least one minute and may be more than two minutes. The syphon tube serves to delay the passage of water through the bed, and its inlet may be located below, but closely adjacent to, the bottom surface of the tea leaf bed and adjacent the bottom of a receptacle surrounding the basket, for holding the bed, the tube extending up to a position near the top of the bed of leaves and then bending over and extending downwardly so that its outlet is below its inlet and extends through the bottom of the receptacle. The arrangement is such that as hot water reaches the tea bed it is held in the receptacle and cannot discharge until its level within the receptacle has risen to the height of the syphon tube bend, well above the bottom of the bed. The water saturating the bed is thus maintained in contact with the tea leaves until the water level reaches the top of the syphon tube. All the water is then discharged through the syphon tube after passing through the bed at a rate which exceeds the rate of hot water supply. It is possible to arrange the height and diameter of the syphon tube and the rate of introduction of hot water so that contact time of water on the leaves is at least one minute.

To maintain the brew liquid level and hence, the soak (or brew) of the tea leaves, the arrangement is preferably such that the relationship between the water inflow and the water outflow is determined by the choice of the discharge pipe (syphon tube) diameter.

Preferably the syphon tube bend is about 58 to 68 mm above the tube outlet and the tube diameter is about 6 to 8 mm.

During discharge, the tea leaves are retained in their bed and virtually all of the brewed beverage is discharged from the bottom of the bed through and out from, the syphon tube.

The inner surface of the inlet arm of the syphon tube is adapted to retain small droplets of brewed tea. This may be achieved by providing the inlet arm with a roughened inner surface, for example, either by sand blasting or acid etching.

In use, when the receptacle is filled to the top of the bend in the syphon tube, the brewed tea is syphoned out at a rate which exceeds the rate of the incoming hot water. Thus the receptacle empties and the syphon is broken.

However, the roughened inner surface of the inlet arm of the syphon causes droplets of tea to be retained inside the tube following discharge of the brew from the tea leaf bed. Subsequently, as hot water continues to fall on the tea leaves, the inlet of the syphon once again becomes covered with liquid and pressure builds up within the inlet arm to drive the droplets over the top of the syphon tube bend and thus initiate a secondary syphon. The syphon stops when the liquid level again falls below the level of the tube outlet. The level the liquid must reach before the secondary syphon commences depends upon the position of the droplets within the inlet arm. The nearer the droplets to the top of the inlet arm and hence the bend, the quicker sufficient pressure will build up for the secondary syphon to start. Thus, while hot water is supplied the syphon continually makes and breaks until the infusion is completely finished. In this way, oversoaking of the tea leaves is avoided once the initial brewing period is finished.

A filter paper is normally provided within a basket to receive the bed of tea leaves.

An outer housing is preferably provided to surround the hot water receptacle to provide double skin thermal insulation to minimise cooling of the beverage during brewing.

The syphon tube is preferably arranged between the receptacle holding the hot water before discharge through the bed and the outer housing. Thus the tea beverage is not cooled quickly during its discharge through the tube as the tube is heated to some extent by the hot water within the receptacle and due to the double insulation effect between the receptacle and the outer housing.

It will be appreciated that the apparatus could be used either for making tea or coffee depending upon the substance present in the bed. Tea bags may be used as well as tea leaves or if coffee is to be produced this may either be ground coffee or instant coffee.

The invention will now be further described by way of example with reference to the accompanying drawings in which.

Figure 1:
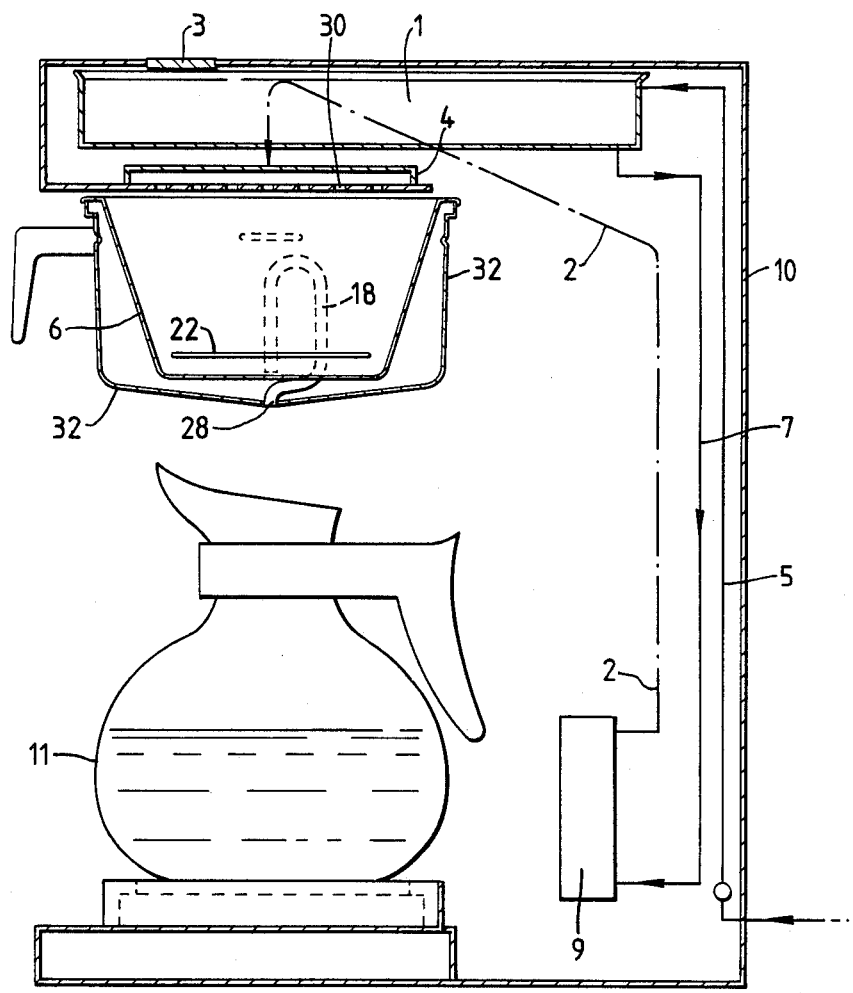
FIG. 1 is a diagrammatic view of a part of a standard coffee brewer modified in accordance with this invention for the production of tea beverage.

FIG. 1 shows generally a standard coffee brewing apparatus which has been modified for the production of tea. The apparatus essentially comprises a housing 10 incorporating a tank 1 for containing cold water supplied to it either manually through an inlet 3 or from the mains through a pipe 5. When it is desired to produce liquor from the apparatus, water is discharged from the tank 1 through a pipe or conduit 7 to a heater 9 which is energised rapidly to increase the temperature of the water to boiling point. The heater 9 is connected through a conduit 2 shown in dot and dash lines to a spray head 4, hot water emerging through outlet holes 30 on to tea leaves contained within a removable receptacle 6 as described hereafter.

After passing through the bed of tea leaves, tea liquor emerges through an outlet 28 as described hereafter to be received in a removable jug or the like 11.

Figure 2:
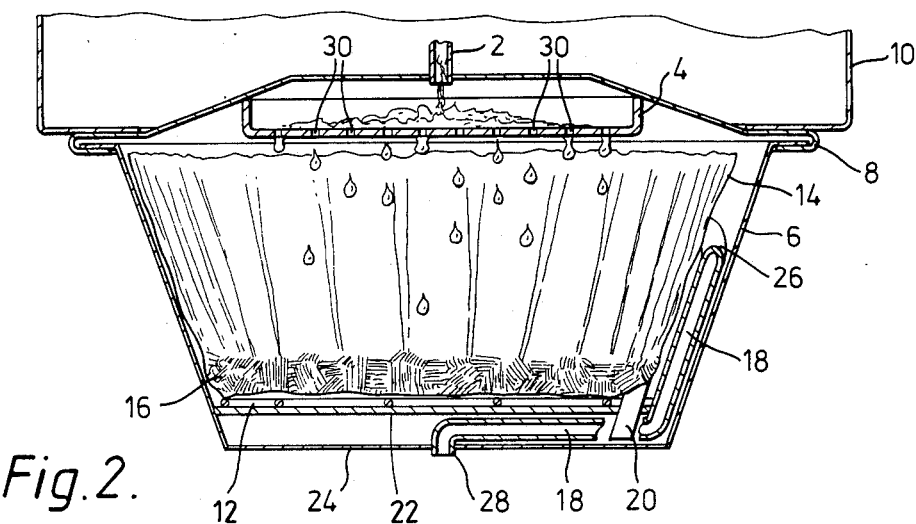
FIG. 2 is a view to an enlarged scale of part of the apparatus shown in FIG. 1.

Referring to FIG. 2 the receptacle 6 may be slid out from the housing 10 and a basket 12 mounted therein may be provided with a filter paper 14 to carry tea leaves to form a tea leaf bed 16.

A syphon tube 18 extends upwardly from an inlet 20, positioned just below a base plate 22 supporting the filter paper and adjacent the bottom wall 24 of the receptacle 6. The syphon tube 18 then extends upwardly between the filter paper 14 and the inner wall of the receptacle 6 to a point 26 where it bends over and descends downwardly again within the wall of the receptacle 6 to an outlet 28 below the inlet 20 and extending through the bottom wall 24 of the receptacle 6. As shown in FIG. 6b, the inlet arm of the syphon tube 18 is provided with a roughened or ridged inner surface 34.

In use, hot water falls on to the bed of tea leaves 16 as illustrated in FIG. 1 in the form of droplets through holes 30 in the spray head 4. These drops fall on the bed of tea leaves 16 and after passage through the bed accumulate on the base 24 of the receptacle. This continues until the water in the receptacle 6 saturates the bed and reaches the level of the bend 26 in the syphon tube. At this moment in time (see FIG. 2 and FIG. 6a) the bed of tea leaves is flooded with water as is the space in the receptacle below the bed of tea leaves. The rate of supply of hot water droplets on to the tea leaves and the height of the syphon tube 18 are made such that the water on average, is in contact with the bed of tea leaves for at least one minute, so as to ensure good extraction of flavour.

Equally the rate of inflow of hot water relative to the rate of outflow through the syphon tube is such that a standard brew or soak time is maintained during the period in which water is sprayed onto the bed. Subsequently, the brewed tea is all exhausted from the bed.

Figure 6A:
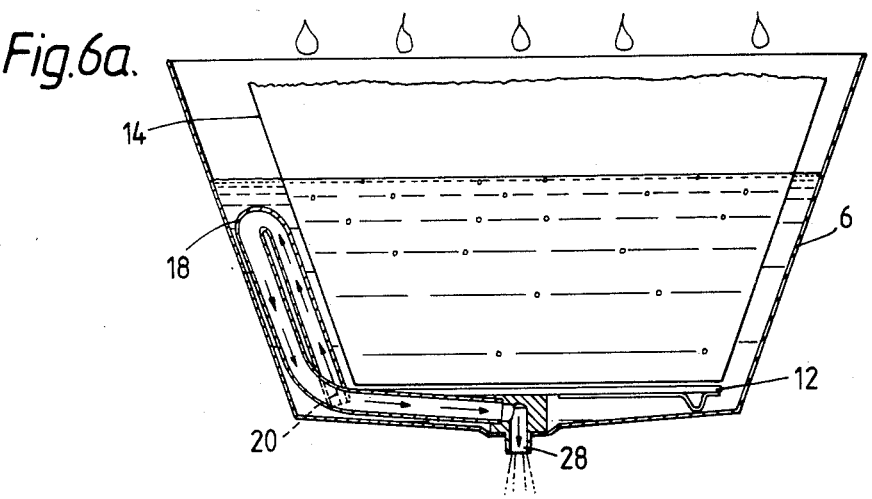
FIG. 6a is a view as in FIG. 3, where the hot water has reached the top of the syphon bend and the brew is discharged.
Figure 6B:
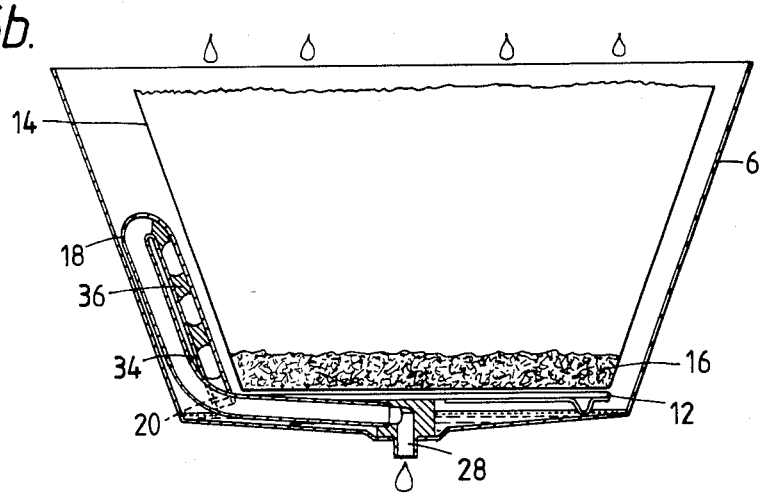
FIG. 6b is a view as in FIG. 3, showing droplets of tea remaining within the syphon tube, following discharge of the brew
Figure 6C:
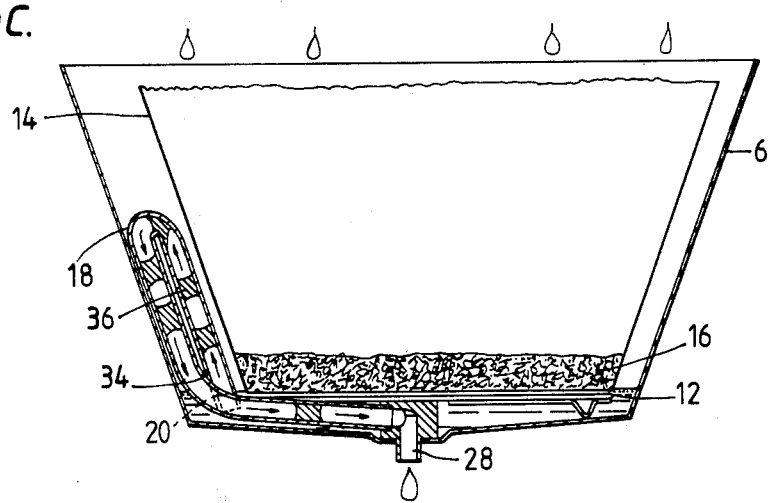
FIG. 6c is a view as in FIG. 3 showing the secondary syphoning effect.

As shown in FIG. 6a, once the water level has reached the bend 26 in the syphon tube it falls over the top of the tube and gets up the self-priming syphon to be discharged through outlet 28 in the form of tea beverage. This syphon action continues until virtually all the water in the tea bed and in the receptacle has been discharged, and the situation is that shown in FIG. 6b. After the brewed tea has been discharged, a few droplets of tea 36 remain within the inlet arm of the syphon tube 18 due to the roughened inner surface 34. As hot water continues to be supplied to the tea leaf bed 16, a small amount of brewed tea accumulates in the bottom of the receptacle 6 until it covers the inlet 20 of the syphon tube 18 as shown in FIG. 6c. When this occurs, pressure builds up within the inlet arm to drive the droplets 36 over the syphon bend and hence aids the start of the secondary syphon which sucks the accumulated tea through the tube 18 to the outlet 28. Since the syphon height and tube diameter is arranged so as to discharge brewed tea at a rate which exceeds the inflow of hot water, the syphon breaks again as soon as the level of accumulated tea falls below the inlet 20 of the syphon 18. However, it will restart when the tea level rises above the inlet 20 on addition of further hot water. Thus the syphon continuously makes and breaks until the infusion is completely finished ensuring that subsequent to the initial brew the water does not oversoak the tea leaves.

Figure 3:
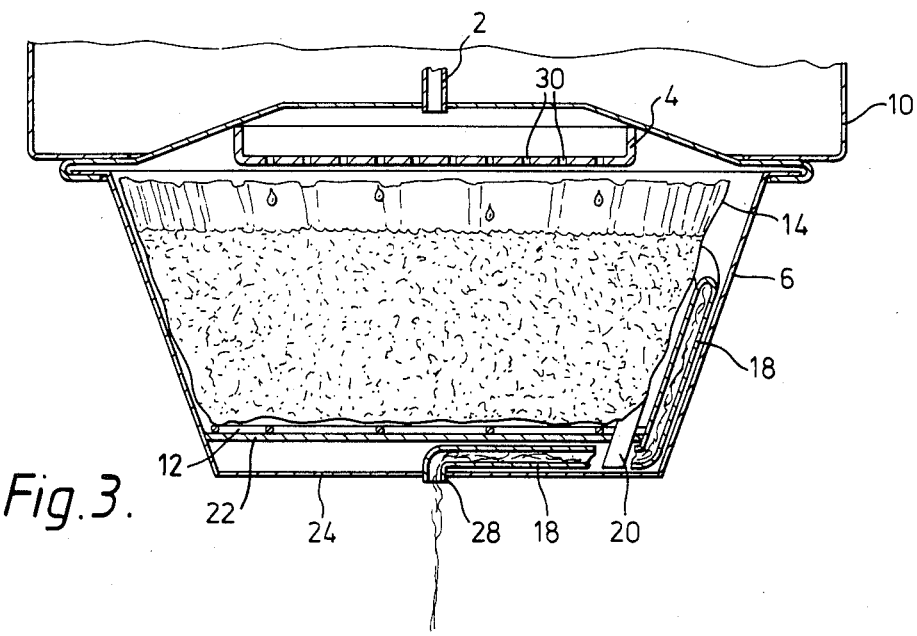
FIG. 3 is a view corresponding to FIG. 2 in which tea is shown discharging from the tea leaf bed.
Figure 4:
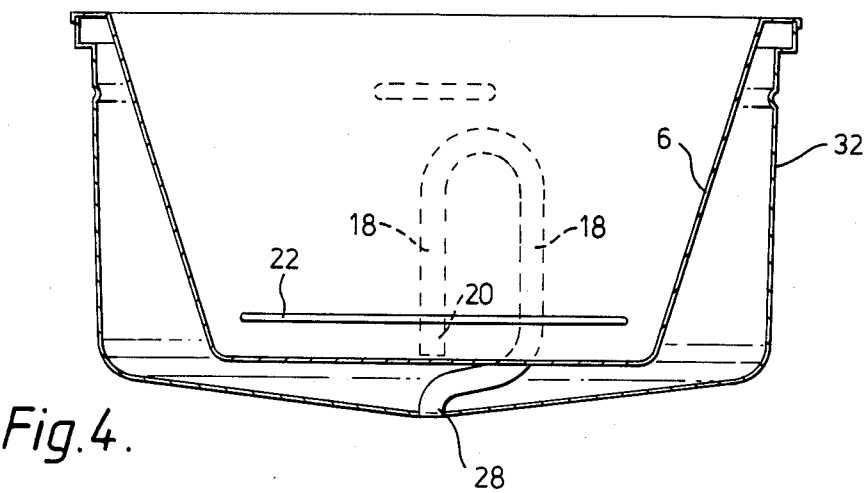
FIG. 4 is a section through a modified embodiment of the unit shown in FIG. 2.
Figure 5:
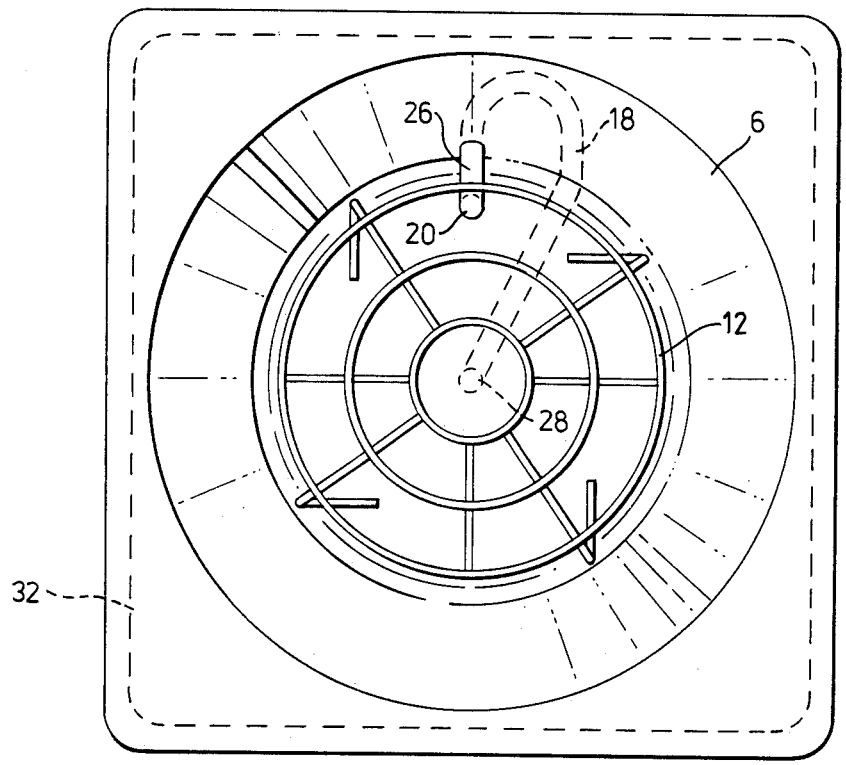
FIG. 5 is a plan view corresponding to FIG. 4.

Referring now back to FIG. 3 the inner receptacle 6 is conveniently mounted within an outer housing 32 to give double skin thermal insulation, the discharge outlet 28 of the syphon tube being through the bottom surface of the outer housing 32. The tube inlet 20 is at the bottom of the inner receptacle so that virtually all tea liquor is discharged from the apparatus through the syphon tube.

As the syphon tube is located within the space between the inner receptacle 6 and the outer housing 32, it is heated by the hot water in the receptacle and when the syphon action commences, tea beverage being discharged through the tube is not unduly cooled.

We claim:

1. Tea making apparatus comprising:
    a basket adapted to hold a bed of tea leaves and defining a bottom wall;
    a housing supporting and surrounding said basket;
    means for heating water;
    a spray head above said basket;
    means for conveying heated water from said heating means to said spray head for distribution therefrom onto a bed of tea leaves on said bottom wall to form brewed tea beverage therefrom; and
    a syphon tube having an inlet arm defining an inlet and an outlet arm defining an outlet, the inlet of the inlet arm being open to the space between the bottom of said basket and the bottom of said housing, said inlet arm and outlet arm defining a junction having a bend, said bend at the junction between the inlet arm and outlet arm being positioned above said basket bottom wall and said outlet arm being below the said inlet, said inlet arm having a roughened inner surface to retain droplets of brewed tea beverage thereon following discharge of the said beverage from said tea leaf bed.

2. Tea making apparatus as claimed in claim 1 wherein the said housing comprises a receptacle mounted within an outlet housing for insulation thereof, and said syphon tube is positioned between said receptacle and said outer housing.

3. Tea making apparatus are claimed in claim 1 wherein said roughened inner surface of the said syphon tube inlet arm comprises a sand-blasted surface.

4. Tea making apparatus as claimed in claim 1 wherein said roughened inner surface of the said syphon tube inlet arm comprises an acid etched surface.

5. Tea making apparatus comprising:
    a basket adapted to hold a bed of tea leaves and defining a bottom wall;
    a housing supporting and surrounding said basket;
    means for heating water;
    a spray head above said basket;
    means for conveying heated water from said heating means to said spray head for distribution therefrom onto a bed of tea leaves on said bottom wall to form brewed tea beverage therefrom; and a syphon tube having an inlet arm defining an inlet and an outlet arm defining an outlet, the inlet of the inlet arm being open to the space between the bottom of said basket and the bottom of said housing, said inlet arm and outlet arm defining a junction having a bend, said bend at the junction between the inlet arm and outlet arm being positioned above said basket bottom wall a distance such that heated water is maintained in contact with the tea leaves for a period in excess of one minute, and said outlet of said outlet arm being below the said inlet, said inlet arm having a roughened inner surface to retain droplets of brewed tea beverage thereon following discharge of the said beverage from said tea leaf bed.

6. Tea making apparatus as claimed in claim 5 wherein the said housing comprises a receptacle mounted within an outlet housing for insulation thereof, and said syphon tube is positioned between said receptacle and said outer housing.

7. Tea making apparatus as claimed in claim 5 wherein said roughened inner surface of the said syphon tube inlet arm comprises a sand-blasted surface.

8. Tea making apparatus as claimed in claim 5 wherein said roughened inner surface of the said syphon tube inlet arm comprised as acid etched surface.

9. Beverage brewing apparatus comprising:

a basket adapted to hold a bed of beverage brewing material and defining a bottom wall;

a housing supporting and surrounding said basket;

means for heating water;

a spray head above said basket;

means for conveying heated water from said heating means to said spray head for distribution therefrom onto a bed of beverage brewing material on said bottom wall to form brewed beverage material therefrom; and a syphon tube having an inlet arm defining an inlet and an outlet arm defining an outlet, the inlet of the inlet arm being open to the space between the bottom of said basket and the bottom of said housing, said inlet arm and outlet arm defining a junction having a bend, said bend at the junction between the inlet arm and outlet arm being positioned above said basket bottom wall and said outlet of said outlet arm being below the said inlet, said inlet arm having a roughened inner surface to retain droplets of brewed beverage thereon following discharge of the said beverage from said beverage brewing material bed.

10. Beverage brewing apparatus as claimed in claim 9 wherein the said housing comprises a receptacle mounted within an outlet housing for insulation thereof, and said syphon tube is positioned between said receptacle and said outer housing.

11. Beverage brewing apparatus as claimed in claim 9 wherein said roughened inner surface of the said syphon tube inlet arm comprises a sand-blasted surface.

12. Beverage brewing apparatus as claimed in claim 9 wherein said roughened inner surface of the said syphon tube inlet arm comprised as acid etched surface.

* * * * *